(12) United States Patent
Boyce et al.

(10) Patent No.: US 7,425,368 B2
(45) Date of Patent: Sep. 16, 2008

(54) FILLER-ENHANCED POLYMERIC FIBERS WITH IMPROVED MECHANICAL PROPERTIES AND METHOD FOR MAKING

(75) Inventors: Mary C. Boyce, Winchester, MA (US); David M. Parks, Pembroke, MA (US); Bin Chen, Stuttgart (DE)

(73) Assignee: Massachusetts Institute of Technology, Cambridge, MA (US)

( * ) Notice: Subject to any disclaimer, the term of this patent is extended or adjusted under 35 U.S.C. 154(b) by 440 days.

(21) Appl. No.: 11/179,102

(22) Filed: Jul. 12, 2005

(65) Prior Publication Data

US 2006/0073329 A1 Apr. 6, 2006

Related U.S. Application Data

(60) Provisional application No. 60/603,066, filed on Aug. 20, 2004.

(51) Int. Cl.
*D02G 3/00* (2006.01)
(52) U.S. Cl. .................................................. 428/372
(58) Field of Classification Search ............... 428/372; 423/447.1
See application file for complete search history.

(56) References Cited

U.S. PATENT DOCUMENTS

| 3,767,756 | A | 10/1973 | Blades et al. |
| 6,852,410 | B2 | 2/2005 | Veedu et al. |
| 6,900,264 | B2 | 5/2005 | Kumar et al. |
| 6,979,709 | B2 * | 12/2005 | Smalley et al. ............... 524/495 |
| 2002/0127162 | A1 * | 9/2002 | Smalley et al. ............... 422/198 |
| 2003/0083421 | A1 | 5/2003 | Kumar et al. |
| 2004/0180201 | A1 | 9/2004 | Veedu et al. |
| 2005/0049355 | A1 * | 3/2005 | Tang et al. ................... 524/496 |
| 2005/0100501 | A1 | 5/2005 | Veedu et al. |
| 2006/0188718 | A1 * | 8/2006 | Nitta et al. ................... 428/373 |
| 2007/0116631 | A1 * | 5/2007 | Li et al. ..................... 423/447.3 |

FOREIGN PATENT DOCUMENTS

WO WO 2005/014708 A1 2/2005
WO WO 2005/030858 A2 4/2005

OTHER PUBLICATIONS

Yang, H.H., *"Kevlar Aramid Fiber"*, Chichester, U.K.: Wiley (1993), pp. 4-7.
Rao, Y. et al., *Polymer* 42 (2001), pp. 5937-5946.
Lee, K.G. et al., *Journal of Polymer Science, Part B: Polymer Physics*, vol. 33, (1995), pp. 1-14.
Kawabata, S., et al., *"Anisotropic Mechanical Properties of Advanced High Performance Fibers Obtained by a Single Fiber Testing System"*, Composite Properties and Applications, Proceedings of the Ninth International Conference on Composite Materials (ICCM/9), Madrid, Spain, Jul. 12-16, 1993, vol. 6, pp. 671-677, edited by Antonio Miravete, Zaragoza, Spain: Woodhead Publishing Limited 1993.
Bartczak, Z. et al., *Polymer* 40 (1999), pp. 2367-2380.

(Continued)

*Primary Examiner*—N Edwards
(74) *Attorney, Agent, or Firm*—Choate Hall & Stewart LLP

(57) ABSTRACT

Filler-enhanced polymeric fiber. High aspect ratio filler particles are placed into intimate contact during processing with a polymeric fiber. The filler particles serve as templates to orient the molecular structure of the polymeric fiber to enhance mechanical properties. The highly oriented molecular morphology results in enhanced axial stiffness and strength.

10 Claims, 2 Drawing Sheets

OTHER PUBLICATIONS

Roche, E. J. et al., *Polymer* 30 (1989), pp. 1776-1784.
Ward, I. M., *"Mechanical Properties of Solid Polymers"*, Second Edition, (1979), pp. 283-286.

Tzika, P.A. *Journal of the Mechanics and Physics of Solids* 48 (2000), pp. 1893-1929.

* cited by examiner

FILLER-ENHANCED POLYMERIC FIBERS WITH IMPROVED MECHANICAL PROPERTIES AND METHOD FOR MAKING

PRIORITY INFORMATION

This application claims priority to provisional patent application U.S. Ser. No. 60/603,066, filed Aug. 20, 2004, entitled Filler-Enhanced Polymeric Fibers with Improved Mechanical Properties and Method for Making. The contents of this provisional application are incorporated herein by reference in their entirety.

BACKGROUND OF THE INVENTION

This invention relates to polymeric fibers and more particularly to filler-enhanced fibers with improved axial, transverse and shear mechanical properties.

Current technology produces aramid and rigid rod polymers with axial stiffness approximately only one-half of the theoretical limits because of misalignment of the underlying molecular morphology in the polymer chains. Furthermore, the orientation of van der Waals interaction planes versus hydrogen bonding planes results in low shear modulus. The molecular morphology misalignment, together with the low shear modulus and orientation of hydrogen bonding planes, also produce poor axial compressive strength of a fiber.

As an example, the prior art dry-jet wet spinning process has been used to produce high performance fibers with highly extended polymer chains as taught in U.S. Pat. No. 3,767,756. It is well known that this process results in chain misorientation at different length scales ranging from paracrystallinity at the nanometer length scale to a pleated structure at the submicron to micron scale. The pleated structure within the fibers is shown in the schematic of FIG. 1 and can be seen in an optical micrograph in Yang, H. H., "Kevlar aramid fiber," Chichester, U.K.: Wiley (1993). For fibers such as Kevlar® and Twaron® that have high crystallinity and planar hydrogen bond interaction, hydrogen bonding is along the radial direction of the fibers. The misorientation of chains resulting in pleating ranges from 6.8° to 21.0° for different types of Kevlar fibers under different conditions in which the pleated structure contributes to chain misorientation from 5° to 10°. See, Rao, et al., *Polymer*, 5937 (2001). This amount of misorientation results in a dramatic decrease in the fiber axial modulus from the ideal fiber axial elastic modulus known as its chain modulus. For example, the ideal fiber axial modulus of Kevlar can be as high as 240 GPa (Lee, et al., *J. Polym. Sci., Part B*: Polym. Phys., 1 (1995)), but the measured Kevlar fiber axial stiffness is only 129.6 GPa, (Kawabata, et al., $9^{th}$ *International Conference on Composite Materials*, Spain (1993)).

The shear properties of these high performance fibers are also quite poor because of their highly anisotropic microstructures. The shear modulus and shear strength of Kevlar fiber are 1.8 GPa and 0.18 GPa respectively (Yang, above). The compressive strength along the fiber axial direction is correlated with the fiber shear properties and is therefore very poor. For the same reason, compressive strength along the fiber transverse direction is also poor.

SUMMARY OF THE INVENTION

In one aspect, the invention is a filler-enhanced polymeric fiber including a polymeric fiber and moderate to high aspect ratio filler particles in intimate contact during processing with the polymeric fiber. The filler particles serve as templates to orient the molecular structure of the polymeric fiber to enhance mechanical properties. In a preferred embodiment, the polymeric fiber is aramid and/or rigid rod polymeric fibers. Suitable aramid fibers according to the invention are Kevlar®, Twaron®, or Technora®. A suitable rigid rod polymeric fiber is PBO. It is preferred that the filler particles be of nano- to submicron-scale in their transverse direction and have moderate to high aspect ratios. Suitable filler particles include carbon nanofibers (CNFs), single-walled nanotubes (SWNTs), multi-walled nanotubes (MWNTs), ZnO, polyhedral oligomeric silsesquioxane (POSS), and $C_{60}$ where particles such as POSS and $C_{60}$ have the potential to self-assemble, aggregate and/or crystallize into the required particle structures.

The filler-enhanced fibers of the invention exhibit improved mechanical properties including axial stiffness, axial strength, shear modulus, axial compressive strength and lateral stiffness.

In a preferred embodiment, the interfiber spacing between the filler particles is less than 350 nm. It is preferred that the filler particle volume fraction and diameter be selected to achieve this interfiber spacing. A suitable volume fraction of filler particles is approximately 3%. The particle volume fraction needed is related to the particle diameter and aspect ratio. It is also preferred that the length of the filler particles be selected to provide a highly axially oriented distribution of filler particles without substantial bending of the filler particles during processing.

Another aspect of the invention is a process for making filler-enhanced polymeric fiber comprising an anisotropic dope including a monomer precursor of a polymer, filler particles and acid. The filler particles are dispersed in the dope and the dope is introduced into a dry-jet wet spinning apparatus. The apparatus produces highly oriented filler particles within the polymeric fiber which serve as a template for orienting and aligning the polymer molecular microstructure of the fiber. A suitable monomer is poly(p-phenylene terehthalamide)(PPTA). Suitable dispersing methods include high energy sonication, twin screwing, coating, functionalization, and acid treatment. The dry-jet wet spinning apparatus produces fiber by means of sequential extrusion, coagulation, spinning/drawing, washing, drying, and heat treatment. The drawing ratio is selected to produce highly oriented filler particles within the polymeric fiber.

BRIEF DESCRIPTION OF THE DRAWINGS

FIGS. 5a and 5b are schematic illustrations showing the distribution of hydrogen bonded planes in a cross section of a fiber in which dashed lines represent hydrogen bonded planes. In FIG. 5a hydrogen bonded planes are along radial directions in virgin Kevlar and in FIG. 5b hydrogen bonded planes surround the carbon nanofibers in the Kevlar composites of the invention.

FIG. 6 is a schematic illustration of the distribution of carbon nanofibers within a Kevlar fiber shown in cross section.

FIG. 7 is an illustration of local hydrogen bonding directions corresponding to isothermal contours of a temperature field.

DESCRIPTION OF THE PREFERRED EMBODIMENTS

Figure 1:
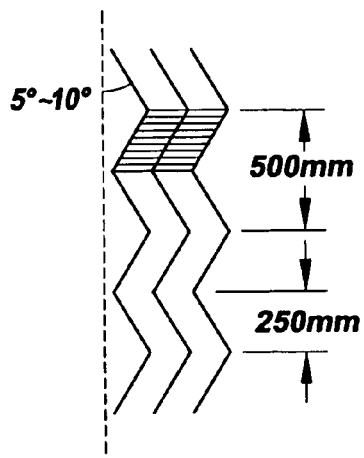
FIG. 1 is a schematic illustration of a pleated structure known to occur in prior art Kevlar fibers.

As discussed above, prior art aramid fibers such as Kevlar have a pleated structure as shown in FIG. 1. This misalignment of the underlying molecular morphology leads to aramid and rigid rod polymers having an axial stiffness of only approximately one-half the theoretical limits. The present invention provides fibers whose microstructures are tailored to improve their mechanical properties by dispersing within a polymer a selected amount of nano- or submicron-fillers during the process for making the fibers. It is preferred that the fillers have a moderate to high aspect ratio and a melting temperature higher than that of the polymer so that the filler particles retain their stiffness throughout the processing. As will be discussed below, the stiff, high aspect ratio filler particles preferentially orient themselves during processing, thereby serving as templates for the molecular orientation of the polymer. Suitable fillers include, but are not limited to, single wall nanotubes (SWNTs), multi-walled nanotubes (MWNTs), carbon nanofibers (CNFs), ZnO, POSS, and $C_{60}$. Some types of fillers can self-assemble and exist in the fibers as a regular nano-structure. For example, SWNTs can form twisted SWNT ropes and POSS or $C_{60}$ can form columns during the process. Suitable virgin polymer for making fibers of the invention includes Kevlar, Twaron, Technora, PBO and other high performance fibers. By way of example only, in the discussion to follow, Kevlar is used as the virgin fiber and CNFs serve as the filler material.

Figure 2:
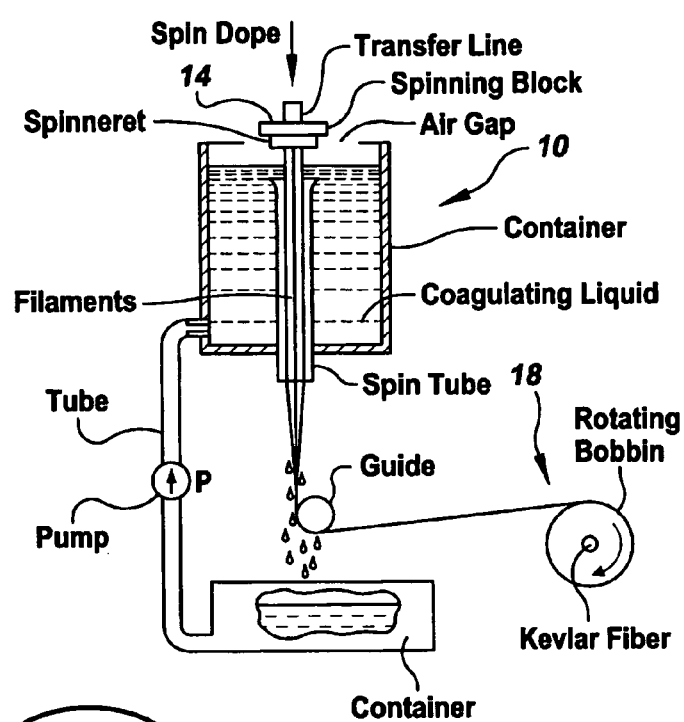
FIG. 2 is a schematic illustration dry-jet wet spinning apparatus suitable for making the filler-enhanced fibers of the present invention.

With reference now to FIG. 2, a dry-jet wet spinning apparatus 10 is employed to produce CNF-filled Kevlar fibers. A dope of poly (p-phenylene terehthalamide) (PPTA), CNFs and strong sulfuric acid is first prepared. The PPTA may be polymerized with or without the added CNFs. The dope is an anisotropic solution that exhibits liquid crystalline behavior. Suitable dispersion of the CNFs in the dope is preferred. Good dispersion can be attained by methods such as high energy sonication, twin screwing, coating, functionalization, acid treatments and other methods known to those of ordinary skill in the art.

The dope is then transferred into the spinning block 14 of the dry-jet wet spinning apparatus 10. After that, the dope goes through a coagulation bath and the resulting fibers are wound onto a rotating bobbin 18. Those skilled in the art will recognize that the dope is subjected to sequential extrusion, coagulation, spinning/drawing, washing, drying, heat treatment, etc. It is preferred that the range of drawing ratio be selected so as to produce highly oriented CNFs within the fiber.

Transcrystallinity is a phenomenon whereby polymer chain conformation and/or crystallinity are greatly influenced by the interaction of polymer molecules at an interface with another material. The presence of the CNF fillers within the polymer fibers induces transcrystallinity. Transcrystallinity has been observed in thin films of crystal, semi-crystal and even amorphous materials. It is also found in bulk material such as in rubber-filled nylon 6.

For bulk materials, transcrystallinity-induced morphology or microstructure change will percolate through the matrix material when the distance between neighboring particles within the matrix is below a critical value. See, Bartczak, et al., *Polymer,* 2367 (1998). Transcrystallinity is manifested in very thin films of PPTA polymer (Roche, et al., *Polymer,* 1776 (1989)), in which hydrogen bonded planes are observed to be parallel to the surface of a glass substrate and the pleating phenomenon is almost completely suppressed. In the CNF-filled Kevlar fiber of the invention, the misorientation of polymer chains is expected to be much smaller than that of virgin fiber because of the suppression of the pleated structure. Further, the once radially oriented hydrogen bonding directions will become parallel to the local surfaces of the CNFs in their vicinities.

Design parameters for a representative CNF in fiber will now be described. Relevant design parameters for the CNF fibers are their diameter, D, length, L, and volume fraction, v. CNF diameter, D, plays an important role; the crystallite size $d_c$ (transverse to local chain direction) is also relevant. The interaction along the interface between the polymer chains and the CNFs is the van der Waals force. This force is weaker than the hydrogen bonds existing in the Kevlar/Twaron transverse direction. Because the van der Waals force is weaker than the hydrogen bonds, we assume that the transverse crystallite size in the Kevlar/Twaron is not altered significantly by the presence of CNFs. The crystallite size, $d_c$, is approximately 4 nm. When CNFs are dispersed in the polymer they will usually have a random orientation distribution. Individual carbon nanofibers may also display a waviness. It is preferred that the CNFs be perfectly aligned and perfectly straight so as to be effective in aligning the polymer chains. When diameter is larger, CNFs will have a correspondingly higher bending stiffness which will resist waviness. At the same time, however, the filler particle diameter should not be too large. According to observations of transcrystallinity in bulk material, the distance between nearby CNFs (referred to herein as the interfiber spacing) is important for CNFs to provide the desired tailored molecular morphology. Although a larger CNF diameter will provide more surface area for interface interaction, diameter can also affect interfiber spacing. The inventors herein have found that interfiber spacing should be controlled to approximately 350 nm or less in order to achieve the desired morphology change due to transcrystallinity and/or chain alignment. The interfiber spacing is a function of CNF diameter and CNF volume fraction. Therefore, CNF diameter cannot be made too large for a given volume fraction because the CNF separation would then be too large. On the other hand, diameter should not be too small resulting in too much curvature in the interface, which can interfere with the templating of the polymer morphology. It is also the case that use of larger diameter CNFs while retaining the maximum allowed interfiber spacing, will increase the required volume fraction of CNFs in the composites, which is not favorable for the effective dispersion of the CNFs. Tables 1 and 2 show the effect of CNF diameter on bending stiffness and volume fraction.

TABLE 1

A series of diameter and bending stiffness with different circular central angle θ

| θ | 5° | 10° | 15° |
|---|---|---|---|
| $D = \dfrac{d_c}{\theta} * 2$ | 92 nm (take $d_c$ = 4 nm) | 46 nm | 3 nm |
| EI (Nm²) | 1.76E−18 | 0.11E−18 | 0.025E−18 |

TABLE 2

A series of volume fraction, $V = \left(\dfrac{R}{D_p + R}\right)^2$, with different circular central angle θ and critical morphology thickness where $D_p$, where $D = 2R$.

| | θ = 5° | θ = 10° | θ = 15° |
|---|---|---|---|
| $D_p$ = 100 nm | 9.9% | 3.5% | 1.8% |
| $D_p$ = 150 nm | 5.5% | 1.7% | 0.9% |
| $D_p$ = 200 nm | 3.5% | 1.1% | 0.5% |
| $D_p$ = 250 nm | 2.4% | 0.7% | 0.3% |
| $D_p$ = 300 nm | 1.7% | 0.5% | 0.24% |

The volume fraction of filler particles is also a design parameter. A desirable CNF volume fraction, V, is a function of CNF diameter and the critical distance for transcrystallinity to percolate within an CNF-Kevlar composite. This critical morphology distance is referred to as $D_p$. The desirable volume fraction is $$V = \left(\dfrac{R}{D_p + R}\right)^2.$$

If the volume fraction is substantially larger than this value, a portion of the CNFs will be ineffective as templates and such a volume fraction will also inhibit good dispersion. On the other hand, if the volume fraction, V, is substantially smaller than this quantity, transcrystallinity cannot effectively percolate through the composite system.

The length, L, of the filler particles is another important design parameter. In prior art thin film experiments reported in the literature, crystal texture is planar. While the polymer chain axes are preferentially parallel to a substrate, the crystals are randomly oriented within this plane because there is no driving force to orient them. In the composite Kevlar fibers of this invention, the fiber spinning/drawing process provides the flow bias to orient the filler particles. That is, flow bias will act to orient the stiff, high aspect ratio filler particles (i.e., the CNFs) during processing. A relatively large length of CNF is therefore needed to provide the high aspect ratio required to produce the highly oriented CNF distribution within the polymer. This highly oriented distribution in turn produces the highly axially oriented matrix morphology in the polymer fiber. We note that the field of polymer rheology with respect to high aspect ratio fibers in a solution is not sufficiently developed to provide strong theoretical guidelines for selecting the best length of filler particles for the present application. It is also noted that care must be taken that filler particle length not be too large to result in particle bending during processing. Such bending would be detrimental to filler particle orientation and the resulting matrix morphology orientation.

Figure 3:
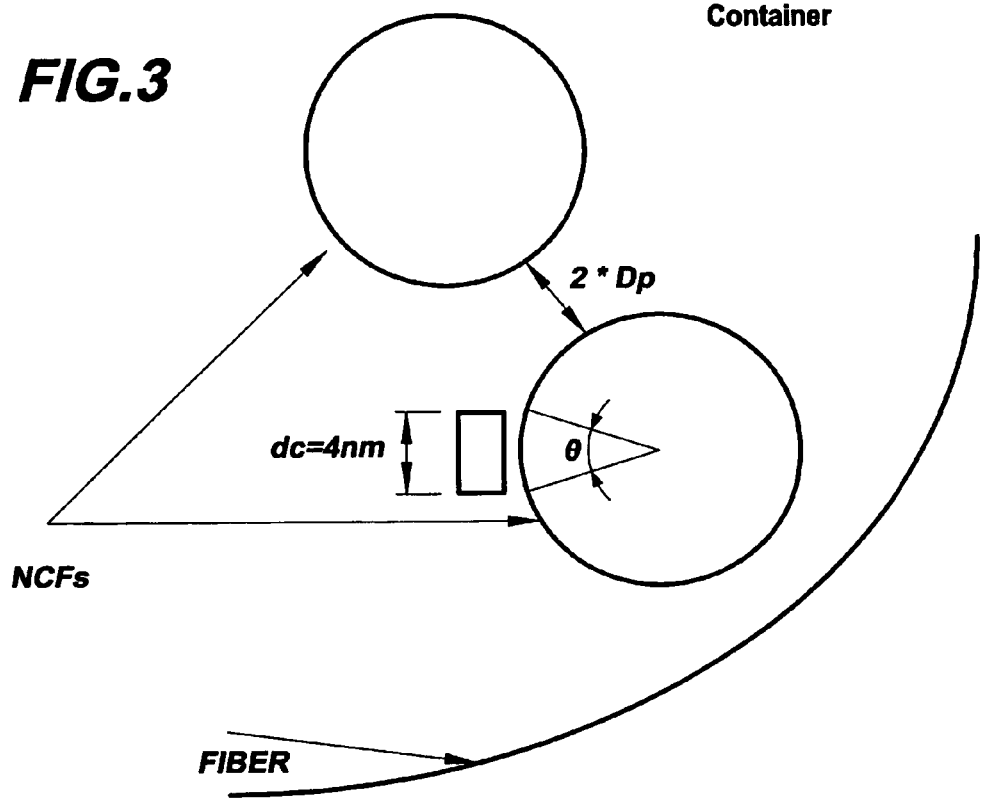
FIG. 3 is a schematic illustration of carbon nanofibers in Kevlar/Twaron.

FIG. 3 illustrates the critical percolation distance, $D_p$, and the angle θ which is the circular central angle spanned by a single crystallite. Tables 1 and 2 above allow one to determine a suitable filler particle diameter, D, and volume fraction, V, as a function of the critical percolation distance, 2*$D_p$, and the angle θ. Bending stiffness, EI, is given in Table 1 on the assumption that the CNF cross section is circular and that the CNF has an elastic modulus of 0.5 TPa.

Figure 4:
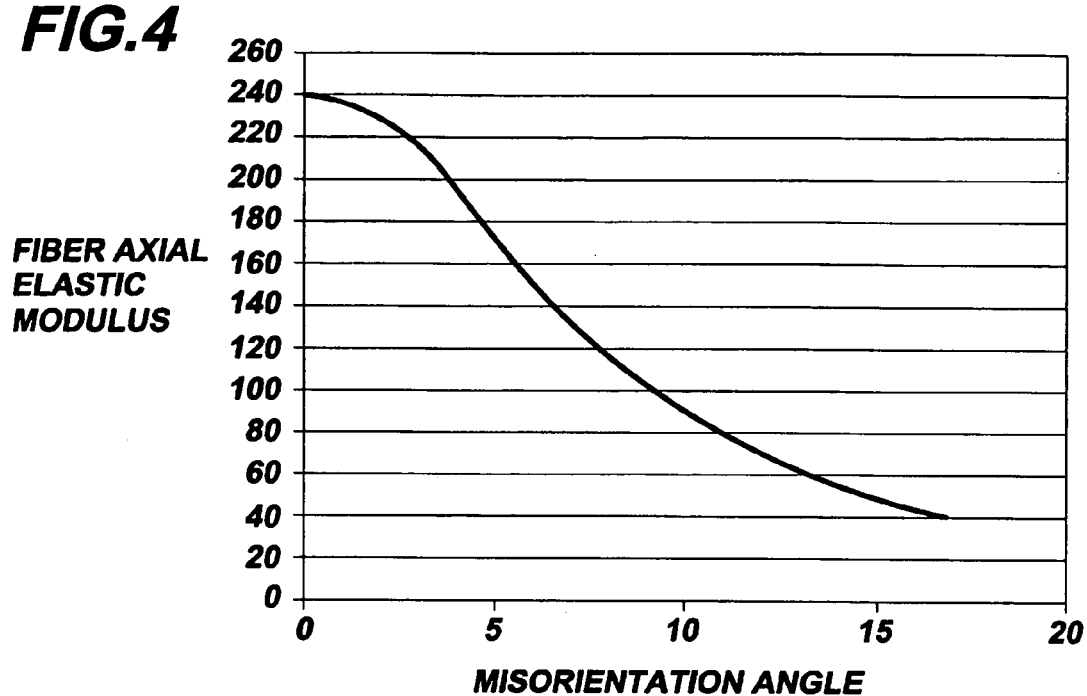
FIG. 4 is a graph showing the effect of polymer chain misorientation on fiber axial elastic modulus.
Figure 4:
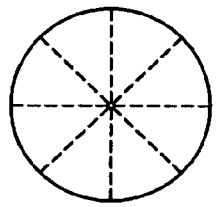
Figure 4:
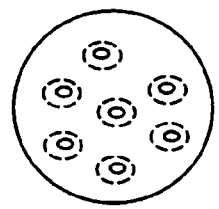
Figure 4:
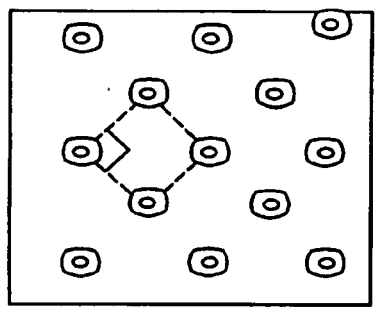
Figure 4:
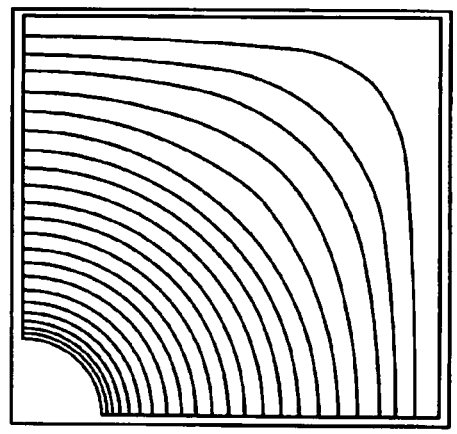

In the CNF-filled Kevlar fiber, the CNFs suppress the formation of the pleated structure illustrated in FIG. 1 and help reduce further the misorientation of the molecular chains. As shown in FIG. 4, a decrease in chain misorientation angle will result in an increase in the fiber axial elastic modulus. The data in FIG. 4 were obtained from an aggregate model. See, Ward, I. M., *Mechanical Properties of Solid Polymers*, John Wylie & Sons (1979). Note that when chain misorientation vanishes, the fiber axial elastic modulus will be the same as the chain modulus, which is about 240 GPa in this model. As can be seen, when the chain misorientation angle decreases from 10° to 5°, the fiber elastic modulus increases from about 80 GPa to about 160 GPa. As mentioned earlier, the misorientation of chains in virgin fibers ranges from 6.8° to 21.0°. Since the pleated structure contributes about 5°~10° misorientation, it follows that suppressing the pleat structure can result in a large increase in fiber axial elastic modulus. Of course, it should be kept in mind that the fiber axial elastic modulus is also influenced by another parameter, paracrystallinity, which corresponds to the local distortion of atoms with respect to undistorted crystal lattice positions. The hydrogen bonding directions in the fiber are also altered. In a virgin Kevlar fiber the hydrogen bonding planes are approximately radially oriented, as shown schematically in FIG. 5a. With CNFs in the fiber, the hydrogen bonding planes are parallel to the CNF surfaces in their vicinities as shown in FIG. 5b.

This new hydrogen bonding arrangement within the CNF-filled fiber will also improve the torsional shear modulus of the fiber. In order to measure the torsional shear modulus of the fiber, pure torque is applied to the fiber ends. For unfilled prior art fiber with morphology in cross section shown in FIG. 5a, only van der Waals interaction is sampled during the measurement. For a filled fiber having the morphology in cross section shown in FIG. 5b, not only van der Waals but also hydrogen bonded interactions are sampled. The elastic shear modulus resulting from hydrogen bonds is usually 2 to 3 times as large as that resulting from van der Waals interactions. It therefore follows that the torsional shear modulus of CNFs-filled fiber will increase.

Shear modulus modeling of the filled fibers of the invention will now be discussed. Assuming that CNFs having the same length as the fiber are periodically arranged in the fiber cross section as shown in FIG. 6, one could make a good approxiamation as to the local hydrogen bonding direction around each CNF by solving a temperature field of a representative volume element (RVE) as shown in FIG. 6. The representative volume element is represented as one-quarter of the dashed-line rectangle in the figure. This technique is described by Tzika, et al. in *Journal of the Mechanics and Physics of Solids*, 1893 (2000). The volume fraction of CNFs is taken as 3% which is a very reasonable value as seen from Table 2.

With reference now to FIG. 7, local hydrogen bonding directions are represented as solid lines corresponding to the isothermal contours of a temperature field. It can be seen that the hydrogen bonding plane is parallel to the interface between the fiber and filler, and smoothly changes to a symmetric condition on the two edges opposite the interface. The CNF-filled fiber can be treated as macroscopically transversely isotropic, which is not the case for the virgin fiber. An anti-plane shear is then applied on a representative volume element to derive macroscopic shear modulus. Since a similarity exists with respect to the governing equations and boundary conditions between an anti-plane shear problem and a temperature field, another temperature field is solved by using appropriate parameters to provide the solution for a corresponding anti-plane shear problem. A parametric study has been performed by varying the ratio of shear modulus of hydrogen bonds to that of van der Waals interactions. As shown in Table 3, the macroscopic shear modulus is derived from the relationship between the macroscopic shear stress and macroscopic shear strain. With the new morphology of the CNFs-filled fiber of the invention, it is clear that shear modulus improvement of as much as 72% can be achieved if the ratio of shear modulus due to the hydrogen bond to that due to the van der Waals force is assumed to be 3.

Table 3 A parametric study of macroscopic shear modulus of the fiber having new morphology where $G_h/G_{vdW}$ is ratio of the shear modulus due to hydrogen bonding to that due to the van der Waals force and $G/G_{vdW}$ is ratio of the macroscopic shear modulus to the shear modulus due to the van der Waals force, with V=0.03.

| $G_h/G_{vdW}$ | $G/G_{vdW}$ |
|---|---|
| 1 | 0.93 |
| 2 | 1.4 |
| 3 | 1.72 |
| 4 | 2.23 |

It is also expected that fiber compressive strength will be improved with the altered morphology in the CNFs-filled fiber. This improvement results from the increase in shear modulus, which should provide a corresponding increase in compressive strength. Further, the spatially distributed nature of the hydrogen bonded planes and van der Waals planes disrupts the propagation of a compressive failure mechanism, resulting in an even higher improvement in compressive strength over that due to shear modulus improvement alone. These morphology changes are also expected to affect the transverse thermal and electrical conductivities.

The focus above on CNFs as the filler and Kevlar fiber as the matrix is merely exemplary. The invention can be practiced with any aramid and/or rigid rod polymeric fibers. It is noted that the geometry of the filler does not have to be cylindrical. For example, the filler can be a column and/or elongated fibers or even have a more complicated geometry which is self-assembled during processing. Note that, the smaller scale fillers, such as self-assembled/aggregated/crystallized POSS and/or $C_{60}$ nanostructured particles, will affect the polymer morphology misorientation at correspondingly smaller length scales than that of the examplar CNF filled Kevlar.

The contents of all of the references cited herein are incorporated by reference in their entirety.

It is recognized that modifications and variations of the invention disclosed herein will occur to those skilled in the art and it is intended that all such modifications and variations be included within the scope of the appended claims.

What is claimed is:

1. Filler-enhanced polymeric fiber comprising;
a polymeric fiber; and
high aspect ratio filler particles dispersed within the polymeric fiber and in intimate contact during processing with the polymeric fiber, the filler particles, having an interfiber spacing of less than 350 nanometers, serving as templates to orient the molecular structure of the polymer fiber to enhance fiber mechanical properties.

2. The polymeric fiber of claim 1 wherein the polymeric fiber is an aramid fiber.

3. The polymeric fiber of claim 1 wherein the polymeric fiber is rigid rod polymeric fiber.

4. The polymeric fiber of claim 3 wherein fiber is PBO.

5. The polymeric fiber of claim 1 wherein the filler particles are of nano-or submicron-scale.

6. The polymeric fiber of claim 1 wherein the elongate filler particles have moderate to high aspect ratio.

7. The polymeric fiber of claim 1 wherein the filler particles are carbon nanofibers, single walled nanotubes, multi-walled nanotubes, ZnO, POSS, or $C_{60}$.

8. The polymeric fiber of claim 1 wherein the mechanical properties are selected from the group consisting of axial stiffness, axial strength, shear modulus, axial compressive strength, and lateral stiffness.

9. Filler-enhanced polymeric fiber comprising:
a polymeric fiber; and
high aspect ratio filler particles dispersed within the polymeric fiber and in intimate contact during processing with the polymeric fiber, the filler particles serving as templates to orient the molecular structure of the polymer fiber to enhance fiber mechanical properties, wherein the filler particle volume fraction and diameter are selected to achieve interfiber spacing less than 350 nanometers.

10. The polymeric fiber of claim 1 wherein the volume fraction of filler particles is approximately 3%.

* * * * *